United States Patent
Andrews et al.

(10) Patent No.: US 9,694,438 B2
(45) Date of Patent: Jul. 4, 2017

(54) HOLLOW COMPONENT MANUFACTURE

(71) Applicant: ROLLS-ROYCE PLC, London (GB)

(72) Inventors: Ian John Andrews, Derby (GB);
Michael James Wallis, Clitheroe (GB);
Ian Fearn, Derby (GB)

(73) Assignee: ROLLS-ROYCE plc, London (GB)

( * ) Notice: Subject to any disclaimer, the term of this patent is extended or adjusted under 35 U.S.C. 154(b) by 302 days.

(21) Appl. No.: 14/509,338

(22) Filed: Oct. 8, 2014

(65) Prior Publication Data
US 2015/0110637 A1    Apr. 23, 2015

(30) Foreign Application Priority Data
Oct. 21, 2013   (GB) .................................. 1318527.7

(51) Int. Cl.
| | |
|---|---|
| *F01D 5/14* | (2006.01) |
| *B23K 20/02* | (2006.01) |
| *B21D 26/055* | (2011.01) |
| *B21D 53/78* | (2006.01) |
| *F04D 29/26* | (2006.01) |

(52) U.S. Cl.
CPC ............ *B23K 20/02* (2013.01); *B21D 26/055* (2013.01); *B21D 53/78* (2013.01); *F01D 5/147* (2013.01); *F04D 29/26* (2013.01); *F05D 2220/36* (2013.01); *F05D 2230/236* (2013.01); *F05D 2250/183* (2013.01); *Y10T 428/12389* (2015.01); *Y10T 428/12486* (2015.01)

(58) Field of Classification Search
CPC ...... B23K 20/02; B21D 26/055; B21D 53/78; F01D 5/147; F04D 29/26; F05D 2220/36; F05D 2230/236; F05D 2250/183
USPC .......................................................... 416/233
See application file for complete search history.

(56) References Cited

U.S. PATENT DOCUMENTS

| | | | | |
|---|---|---|---|---|
| 3,934,441 A | * | 1/1976 | Hamilton ............. | B21D 26/055 72/364 |
| 4,331,284 A | * | 5/1982 | Schulz ................ | B21D 26/055 228/118 |

(Continued)

FOREIGN PATENT DOCUMENTS

| | | |
|---|---|---|
| GB | 2 289 429 A | 11/1995 |
| GB | 2 402 716 A | 12/2004 |

OTHER PUBLICATIONS

Feb. 12, 2015 Search Report issued in European Application No. 14188126.

(Continued)

*Primary Examiner* — Ninh H Nguyen
*Assistant Examiner* — Aaron R Eastman
(74) *Attorney, Agent, or Firm* — Oliff PLC

(57) ABSTRACT

A method of manufacturing a hollow component, such as a fan blade for a gas turbine engine, includes the steps of: (a) providing first and second panels and a membrane; (b) providing a stop-off material on at least one of the first and second panels and the membrane to define regions where no diffusion bonding is to take place; (c) assembling the panels and the membrane together so the membrane is between the panels; (d) diffusion bonding the panels and the membrane together. The method is such that when assembled in step (c) the membrane does not extend to at least one edge of the first and second panels, so that in that region the first and second panels are diffusion bonded directly to each other.

13 Claims, 3 Drawing Sheets

(56) References Cited

U.S. PATENT DOCUMENTS

| | | | | |
|---|---|---|---|---|
| 4,361,262 A | * | 11/1982 | Israeli | B21D 26/055 |
| | | | | 156/197 |
| 4,526,312 A | * | 7/1985 | Goss | B21D 26/055 |
| | | | | 228/157 |
| 4,549,685 A | | 10/1985 | Paez | |
| 5,118,026 A | * | 6/1992 | Stacher | B23K 20/18 |
| | | | | 228/157 |
| 7,533,794 B2 | * | 5/2009 | Comley | B23K 20/023 |
| | | | | 228/157 |
| 2005/0133567 A1 | * | 6/2005 | Runyan | B21D 26/055 |
| | | | | 228/112.1 |
| 2006/0086774 A1 | * | 4/2006 | Sanders | B21D 26/055 |
| | | | | 228/112.1 |

OTHER PUBLICATIONS

Search Report issued in British Application No. 1318527.7 issued Apr. 17, 2014.

* cited by examiner

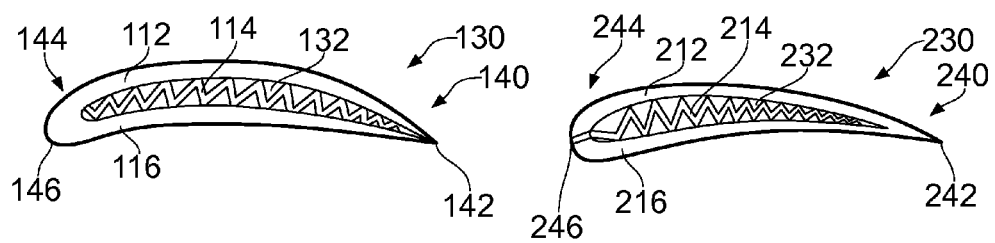
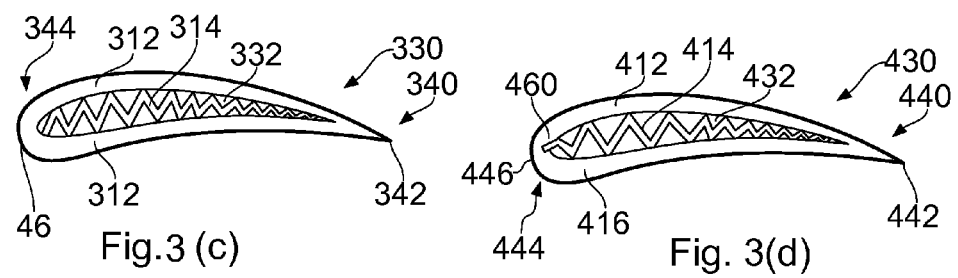
Fig. 3(a)  Fig. 3(b)  Fig. 3(c)  Fig. 3(d)
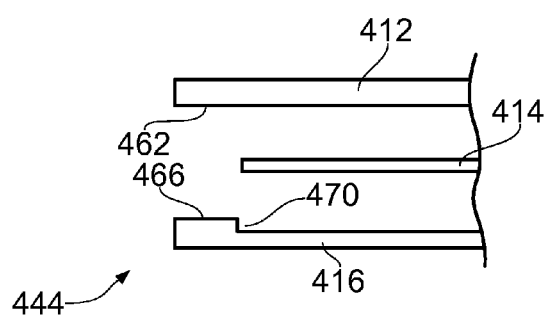
FIG. 4

HOLLOW COMPONENT MANUFACTURE

This invention relates to hollow components formed by a diffusion bonding process, and is particularly (although not exclusively) suitable for manufacturing blades for gas turbine engines.

Superplastic forming (SPF) and diffusion bonding (DB) techniques are well known for the production of hollow metallic components with an internal structure, such as fan blades for gas turbine engines.

A known technique for manufacturing a hollow fan blade using DB/SPF techniques is disclosed in United Kingdom patent number GB2289429, a drawing from which has been adapted as FIG. 1.

Briefly, the usual way of achieving superplastic forming of the interior structure of a hollow component manufactured from a number of metallic layers is to diffusion bond the layers to each other in selected places to define the areas in the interior structure where superplastic forming will not occur. Thereafter the component is heated to a suitable temperature in a furnace and inflated by pumping an inert gas into its interior at high pressure until a desired amount of superplastic deformation occurs. During inflation the component is restrained between dies to prevent over-inflation and achieve the desired external shape.

FIG. 1 is an exploded view of a prior art stack of workpieces which are to be diffusion bonded and superplastically formed to form a hollow component. Three identically-sized sheets of titanium alloy 12, 14 and 16 are assembled into a stack 10. Sheets 12 and 16 are panels, which will form the outer shell of the component. Sheet 14 is the membrane which will form the internal structure of the component. It should be emphasised that FIG. 1 is schematic; in real embodiments the sheets 12, 14, 16 may not be of equal thickness. Typically, the membrane 14 would be thinner than the panels 12, 16. Prior to assembling the sheets into the stack, the mating surfaces 18, 20, 22 and 24 of the sheets 12, 14 and 16 are prepared for diffusion bonding by chemical cleaning. One of the mating surfaces 18 and 20, in this example mating surface 18, has had a stop-off material applied, and one of the mating surfaces 22 and 24, in this example mating surface 24, has had a stop-off material applied. The stop-off material is applied in desired patterns 26 and 28 by a known silk screen printing process, but other suitable methods may be used. The desired patterns 26 and 28 of stop-off material prevent diffusion bonding between preselected areas of the sheets 12, 14 and 16. In this example the stop-off is applied in straight lines, but it may be applied as dots or other suitable patterns depending on the particular hollow component to the manufactured. The three sheets of titanium alloy 12, 14 and 16 are then assembled into the stack 10.

FIG. 2(a) shows a side view of a prior art blade 30 formed from the stack shown in FIG. 1, following a superplastic forming process; FIG. 2(b) shows a section on the line A-A' of FIG. 2(a). The blade 30 extends in a radial direction from a root 54 to a tip 52, and in a chordwise direction from a leading edge 46 to a trailing edge 42.

The blade 30 has an internal cavity 32, within which the membrane 14 has been expanded during the superplastic forming process to define an internal structure. The dotted line 34 indicates the extent of the internal cavity 32. Surrounding the internal cavity 32, the edge regions 36 of the blade are completely bonded, defining what is sometimes referred to as a "picture frame". The edge regions extend from the boundary 34 of the internal cavity 32 towards the leading edge 46, trailing edge 42, tip 52 and root 54 of the blade. As shown in FIG. 2(b), in these edge regions the membrane 14 is completely bonded between the panels 12 and 16, so that in each edge region there are two bonds—between panel 12 and membrane 14, and between membrane 14 and panel 16.

Because the membrane 14 is only required to form the internal structure of the blade 30, it performs no function in the edge regions 36. The presence of this additional, unnecessary membrane material in the edge regions therefore adds to the cost of the blade. This effect is compounded because the membrane is relatively expensive compared with the panels 12 and 16.

It is therefore an aim of the invention to reduce or overcome the disadvantages of known techniques for DB/SPF forming of hollow components such as fan blades.

Accordingly, the invention provides a method of manufacturing a hollow component and a component manufactured by such a method, as set out in the claims.

BRIEF DESCRIPTION OF THE DRAWINGS

Embodiments of the invention will now be described in more detail, with reference to the attached drawings, in which

FIGS. 3(a)-3(d) show cross-sectional views of four embodiments of a blade according to a second aspect of the invention;

FIG. 4 shows an exploded, schematic side view of part of the leading edge region of a stack of workpieces which are to be diffusion bonded and superplastically formed to form a component according to a second aspect of the invention.

FIG. 3(a) shows a cross-sectional view of a first embodiment of a blade 130 in accordance with a second aspect of the invention. The cross-section is taken approximately on the same line A-A' as for the view of FIG. 2(b).

Figure 2:
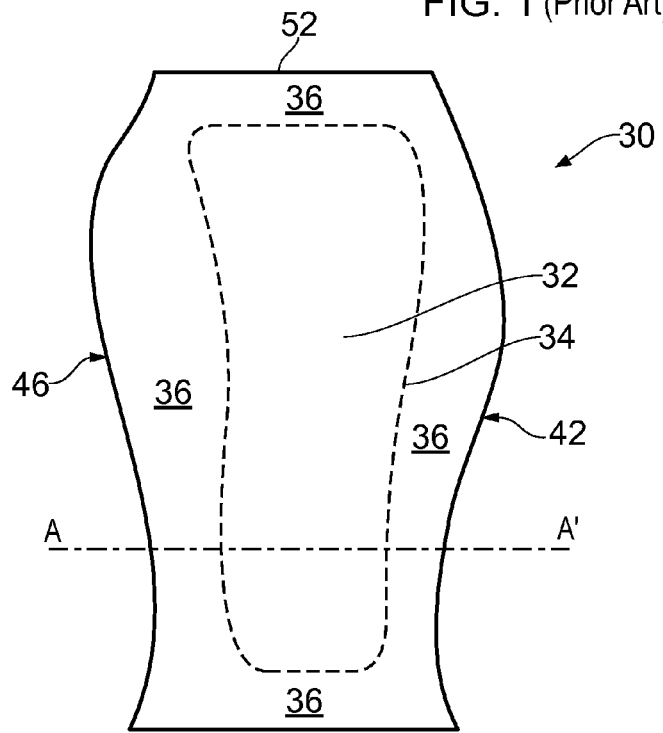
FIG. 2(a) shows a side view of a prior art blade 30 formed from the stack shown in FIG. 1, following a superplastic forming process.
FIG. 2(b) shows a cross-sectional view on the line A-A' of FIG. 2(a)
Figure 2B:
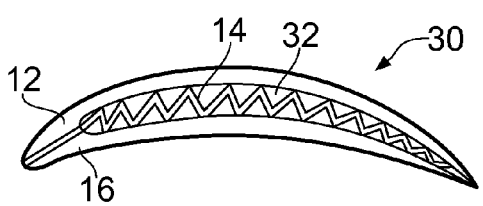

In the same manner as shown in FIG. 2(b), panels 112 and 116 define the outer surfaces of the blade, and membrane 114, which has been selectively bonded during a DB process and expanded during an SPF process, defines an internal structure within the internal cavity 132. Within the trailing edge region 140, the membrane 114 extends to the trailing edge 142 as in the prior art arrangement of FIGS. 2(a) and 2(b); but in contrast, in the leading edge region 144, the membrane is curtailed so that it does not extend beyond the boundary of the internal cavity 132. In the leading edge region, therefore, between the boundary of the internal cavity 132 and the leading edge 146, the panels 112 and 116 are diffusion bonded directly to each other.

Because the membrane 114 is smaller than in the prior art arrangement, it is cheaper to manufacture; the smaller membrane will require less profiling to shape, and this will also reduce the cost. It will also provide a more open structure during the bake-out process (when the stop-off binder is removed), which may reduce the cycle time for this operation. These advantages will reduce the cost of the finished blade 130.

FIG. 3(b) shows an alternative embodiment of a blade 230 in accordance with a second aspect of the invention. Panels 212 and 216 define the outer surfaces of the blade, and membrane 214 defines an internal structure within the internal cavity 232. In this embodiment, the membrane 214 extends all the way to the leading edge 246; but in the trailing edge region 240, the membrane is curtailed so that it does not extend beyond the boundary of the internal cavity 232. In the trailing edge region, therefore, the panels 212 and 216 are bonded directly to each other.

FIG. 3(c) shows a further alternative embodiment of a blade 330 in accordance with a second aspect of the invention. As in the previous embodiments, panels 312 and 316 define the outer surfaces of the blade, and membrane 314 defines an internal structure within the internal cavity 332. In this embodiment, the membrane is curtailed at both ends, so that it does not extend beyond the boundary of the internal cavity 332 either towards the leading edge 346 or towards the trailing edge 342. In both the leading edge 344 and trailing edge 340 regions, between the boundary of the internal cavity 332 and the leading 346 and trailing 342 edges respectively, the panels 312 and 316 are diffusion bonded directly to each other.

A further advantage of the invention is best explained by reference to the embodiment of FIG. 3(c). In this embodiment the membrane 314 forms and defines the internal structure of the blade 330. As explained above, the membrane does not extend beyond the boundary of the internal cavity 332 either towards the leading edge 346 or towards the trailing edge 342. In fact, the edge of the membrane will stop slightly short of the boundary of the internal cavity, but (because the edge of the membrane does not perform any function) its exact position, relative to the boundary of the internal cavity, is unimportant. Therefore, in contrast to the prior art assembly, manufacturing tolerances or slight inaccuracies in the positioning of the membrane may be tolerated without any detrimental effect on the performance of the resulting blade. This may lead to savings in cost or time in the manufacturing process.

It will be appreciated that corresponding embodiments of the invention are possible in which the membrane is curtailed and does not extend to tip of the blade, or to the root, or to both. These embodiments may be combined with those shown in FIGS. 3(a) to 3(c), so that the membrane may be curtailed in any combination of the four edge regions.

FIG. 3(d) shows a further alternative embodiment of a blade 430 in accordance with a second aspect of the invention. Panels 412 and 416 define the outer surfaces of the blade, and membrane 414 defines an internal structure within the internal cavity 432. In this embodiment, as in the embodiment of FIG. 3(c), the membrane is curtailed, so that it does not extend beyond the boundary of the internal cavity 432 towards the trailing edge 442. In the leading edge region 444, however, the membrane extends by a short distance beyond the boundary of the internal cavity 432, so that in the region 460 it is bonded between the panels 412 and 416. This arrangement may help to locate the membrane 414, to ensure that it is in the correct position and orientation with respect to the panels 412 and 416.

Optionally, features may be provided in one or both panels 412, 416 to ensure that the membrane 414 is in the correct position before the DB and SPF processes. Such features may comprise, for example, physical features in the panels to provide a datum location for the membrane, or corresponding holes in the panels and membrane through which dowels may be fitted. FIG. 4 shows an exploded, schematic view of part of the leading edge region of a stack of workpieces which are to be diffusion bonded and superplastically formed to form a component according to a second aspect of the invention. The arrangement shown in FIG. 4 would be suitable, for example, to form the embodiment of FIG. 3(d).

In FIG. 4, panels 412 and 416 have corresponding mating surfaces 462 and 466, which come into contact when the stack is assembled and are subsequently bonded together during the DB process. In the embodiment shown in FIG. 4, the panel 416 also has a recess 470 extending along the mating surface 466. When the stack is assembled, the edge of the membrane 414 engages in the recess 470, so that during the DB process the edge of the membrane will be bonded into that position. In this way, the correct positioning of the membrane 414 relative to the panels 412 and 416 is assured.

Alternatively or additionally, similar recesses may be provided at the trailing edge, tip or root regions of the panels.

Figure 1:
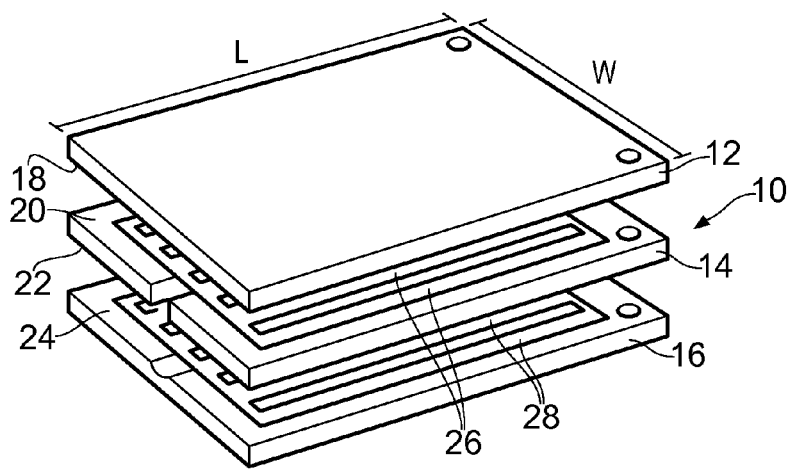
FIG. 1 is an exploded, schematic view of a prior art stack of workpieces which are to be diffusion bonded and superplastically formed to form a hollow component.
Figure 5:
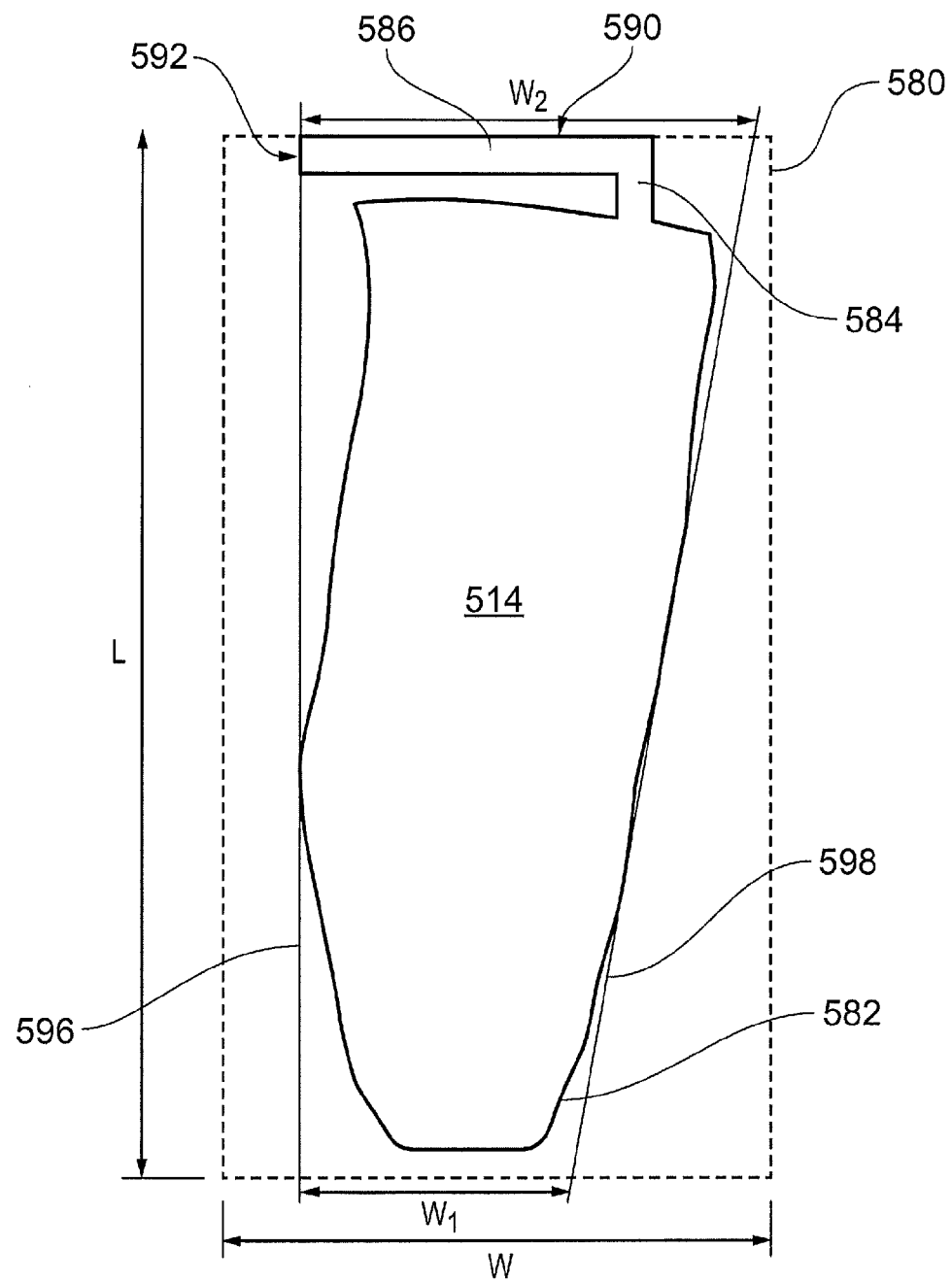
FIG. 5 shows a plan view of a further embodiment of the invention.

FIG. 5 shows a plan view of an embodiment of the invention similar to that shown in FIG. 3(c) and described above. The rectangle 580, shown by dashed lines, corresponds to the dimensions L and W of the sheets 12, 14 and 16 of FIG. 1. As previously explained, in prior art arrangements such as that shown in FIG. 1 the membrane 14 of FIG. 1 is the same size (L × W) as the panels 12 and 16.

In the embodiment shown in FIG. 5, the membrane 514 is curtailed so that it does not extend beyond the boundaries of the internal cavity that will be formed during the SPF process. The outline 582 of the membrane 514 corresponds to the outline of the internal cavity (as shown, for example, by the internal cavity 32 of the blade 30 in FIG. 2(a)). In the same manner as in the embodiment of FIG. 3(c), therefore, the membrane 514 will not extend beyond the boundary of the internal cavity of the formed blade either towards the leading edge or the trailing edge. In the embodiment of FIG. 5, the membrane 514 will also not extend beyond the boundary of the internal cavity of the formed blade towards the tip or the root.

The membrane 514 of FIG. 5 also includes a membrane tag 584. The membrane tag 584 defines the shape 586 of the blow slot (through which the inert gas is pumped into the interior of the component during the SPF process) and also provides alignment features 590, 592. These alignment features 590, 592 comprise straight edges by which the membrane 514 may be accurately located and aligned with respect to the panels (corresponding to panels 12, 16 in FIG. 1) which will form the outer panels of the blade.

The outline 582 of the membrane 514 lies within the lines 596, 598; it is clearly apparent that the membrane 514 is considerably smaller (and therefore requires less material) than the prior art membrane (bounded by the rectangle 580). The trapezoidal shape of the membrane 514 (as illustrated by the widths $W_1$ and $W_2$) also permits nesting of pairs of membranes on the source sheet of material (with adjacent membranes inverted), thereby further reducing the amount of material used.

Other optional features may be provided, in combination with the embodiments described above.

The membrane may be tapered in one or two directions.

The membrane edges may be formed (e.g. chamfered or wedge-shaped) to assist in final location and to help define the final edge of bond profile.

One or more of the membrane edges may be shaped or otherwise formed to assist in its location, or may include poka-yoke features. For example, features may be included to ensure that the panels and membrane can only be assembled in the correct orientation relative to one another.

As described above, the membrane may be curtailed on one, two, three or all four edges.

The membrane may only run to the edge in order to meet up with a datum point.

The membrane may be shaped (i.e. not just rectangular, square or circular). For example, the membrane may be shaped to correspond to the shape of the internal cavity to maximise material usage.

The membrane may be formed of a different material than the panels. In particular, it may not be necessary to use an erosion-resistant material for the membrane, because (in contrast to the prior art arrangement) it will not extend between the panels to the outside in a position on the blade where erosion is likely to occur.

Although the description refers to fan blades for gas turbine engines, and describes embodiments in which the blades are principally formed of titanium or titanium alloy, it will be appreciated that the principles of the invention may be applied equally well to other hollow components, such as OGVs or other vanes in gas turbine engines, or for corresponding components in steam turbines. Likewise, the advantages of the invention may be achieved in components made from any material that can be formed using DB/SPF techniques.

The invention claimed is:

1. A method of manufacturing a hollow component comprising the steps of:
    (a) providing first and second panels and a membrane;
    (b) providing a stop-off material on at least one surface to define regions where no diffusion bonding is to take place;
    (c) assembling the panels and the membrane together so the membrane is between the panels and extends beyond a boundary of an internal cavity so that a portion of the membrane is bonded between the panels, but the membrane does not extend to an edge of the panels; and
    (d) diffusion bonding the panels and the membrane together;
    wherein in a region of the edge of the panels, the first and second panels are diffusion bonded directly to each other.

2. The method of claim 1, in which the component is a fan blade for a gas turbine engine.

3. The method of claim 1, in which the first and second panels each have a leading edge, a trailing edge, a tip and a root, and the membrane does not extend to at least one of the leading edge, the trailing edge, the tip and the root.

4. The method of claim 1, in which at least one of the first and second panels and the membrane has a locating feature so that in step (d) the position of the membrane is correct with respect to the first and second panels.

5. The method of claim 4, in which the locating feature is a recess.

6. The method of claim 4, in which the locating feature is configured to ensure that the orientation of the membrane is correct with respect to the first and second panels.

7. A hollow component formed by the method of claim 1.

8. A hollow component formed by a diffusion bonding process, the component formed from first and second panels with a membrane between them, at least one of the first and second panels and the membrane having a stop-off material applied to it to define regions where no diffusion bonding is to take place, wherein the membrane extends beyond a boundary of an internal cavity so that a portion of the membrane is bonded between the panels, but the membrane does not extend to an edge of the panels, and in the diffusion bonding process the first and second panels are diffusion bonded directly to each other in the region of the edge of the panels.

9. The component of claim 8, the component being a fan blade for a gas turbine engine.

10. The component of claim 8, in which the first and second panels each have a leading edge, a trailing edge, a tip and a root, and the membrane does not extend to at least one of the leading edge, the trailing edge, the tip and the root.

11. The component of claim 8, in which at least one of the first and second panels and the membrane has a locating feature so that the position of the membrane is correct with respect to the first and second panels.

12. The component of claim 11, in which the locating feature is a recess.

13. The component of claim 11, in which the locating feature is configured to ensure that the orientation of the membrane is correct with respect to the first and second panels.

* * * * *